United States Patent
House et al.

(10) Patent No.: US 7,815,037 B2
(45) Date of Patent: Oct. 19, 2010

(54) LIFTING/HOLDING SLATS FOR A SLAT CONVEYOR

(75) Inventors: Michael C. House, Redmond, OR (US); Scott M Delamarter, Madras, OR (US)

(73) Assignee: Keith Manufacturing Co., Madras, OR (US)

( * ) Notice: Subject to any disclaimer, the term of this patent is extended or adjusted under 35 U.S.C. 154(b) by 307 days.

(21) Appl. No.: 12/221,296

(22) Filed: Aug. 1, 2008

(65) Prior Publication Data
US 2010/0025195 A1    Feb. 4, 2010

(51) Int. Cl.
*B65G 25/04* (2006.01)
(52) U.S. Cl. ............... 198/750.2; 198/750.1; 198/774.4
(58) Field of Classification Search ...  198/750.2–750.7, 198/750.14, 774.4
See application file for complete search history.

(56) References Cited

U.S. PATENT DOCUMENTS

| | | | | |
|---|---|---|---|---|
| 5,588,522 A | * | 12/1996 | Foster et al. | 198/775 |
| 6,439,375 B1 | * | 8/2002 | Foster et al. | 198/775 |
| 6,675,956 B1 | * | 1/2004 | Foster et al. | 198/775 |
| 7,185,755 B1 | * | 3/2007 | Foster et al. | 198/750.2 |

* cited by examiner

*Primary Examiner*—Gene Crawford
*Assistant Examiner*—William R Harp
(74) *Attorney, Agent, or Firm*—Delbert J. Barnard; Bruce A. Kaser

(57) ABSTRACT

A conveyor comprises laterally spaced apart lifting/holding slats (12) and laterally spaced apart conveying slats (10) between the lifting/holding slats (12). The conveying slats (10) are advanced in a first direction for conveying a load and are retracted in a second direction for returning them to a start position. The lifting/holding slats (12) have lower portions (62) which reciprocate and upper portions (60) which move up and down. Cams (96, 98) operate in response to longitudinal movement of the lower slat members (62) to raise and lower the upper slat members (60). One end of the upper slat members (60) is connected to a fixed structure (18') by a pivoting link (110) which pivots to permit up and down movement of the slat member (62) while preventing lengthwise movement of the slat member (62). The cams (96, 98) are adapted to lift the upper slat member (60) when the lower slat member (62) is slid lengthwise towards the fixed ends of the upper slat members (60), and to permit a downward movement of the upper slat members (60) in response to movement of the lower slat members (62) in the opposite direction.

7 Claims, 17 Drawing Sheets

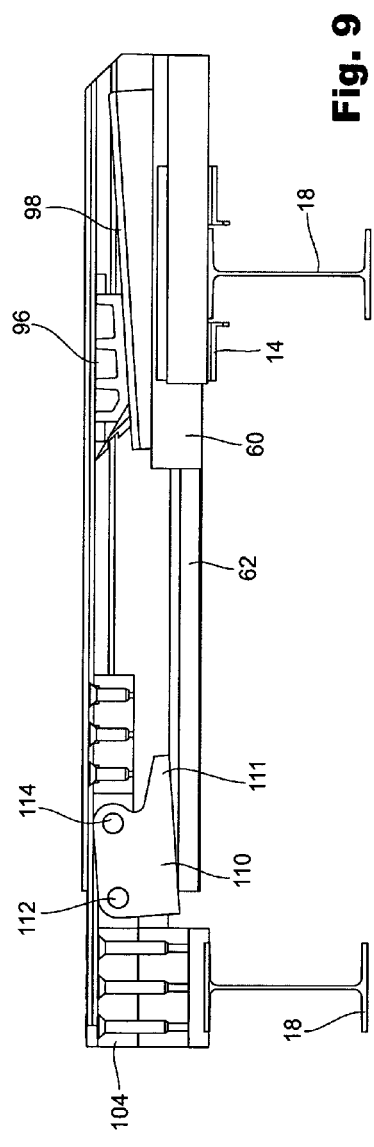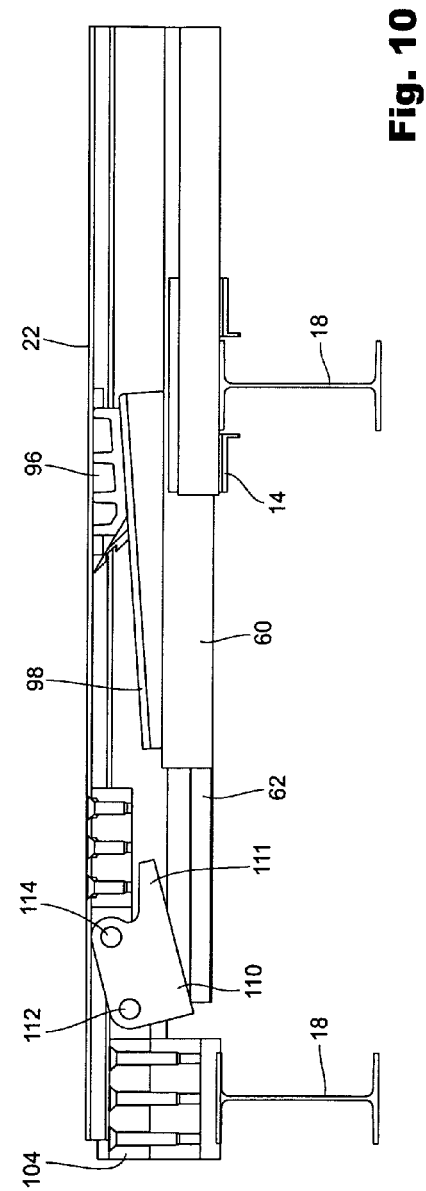

LIFTING/HOLDING SLATS FOR A SLAT CONVEYOR

TECHNICAL FIELD

This invention relates to reciprocating slat conveyors of the type having a set of movable slats for conveying a load and a set of lifting/holding slats for lifting and holding a load while the movable slats are being retracted.

BACKGROUND OF THE INVENTION

The background technology from the present invention is disclosed in U.S. Pat. No. 5,588,522, granted Dec. 31, 1996, to Raymond Keith Foster, in U.S. Pat. No. 6,439,375, granted Aug. 27, 2002, to Raymond Keith Foster, and in U.S. Pat. No. 7,185,755, granted Mar. 6, 2007, to Raymond Keith Foster and Scott Michael Delamarter. The disclosures of these patents are incorporated herein.

There is a need for slat constructions that will facilitate the manufacture, installation and operation of the conveying slats and the lifting/holding slats. The principal object of the present invention is to address this need.

BRIEF SUMMARY OF THE INVENTION

The lifting/holding slats of the invention each comprises an elongated lower slat mounted for back and forth endwise movement and an elongated upper slat above the lower slat. The upper slat has an end portion and a top. A support is provided endwise of the end portion of the upper slat. A link connects the support to the end portion of the upper slat. The link has a first end that is connected to the support for pivotal movement about a first horizontal axis, and a second end that is connected to the upper slat for pivotal movement about a second horizontal axis. The link includes a stop arm extending from the second horizontal axis into a position below the upper slat. A lower ramp is connected to the lower slat and an upper ramp is connected to the upper slat. The upper ramp has a sloping lower surface and the lower ramp has a sloping upper surface. The sloping upper and lower surfaces confront each other and both slope downwardly towards the link. An endwise sliding motion of the lower slat towards the link will slide the lower slide ramp relatively along the upper ramp, causing the lower ramp to lift the upper ramp and the upper slat relative to the lower ramp and the lower slat. The upward movement of the upper slat relative to the lower slat will cause the link to pivot upwardly until the stop arm contacts the upper slat and stops further pivotal movement of the link and stops further upward sliding movement of the upper slat relative to the lower slat.

In preferred form, the lower slat has opposite side members and the upper slat has opposite side members which are positioned outwardly adjacent the side members of the lower slat. The upper ramp includes a cavity with a top and side portions including slideway grooves. The lower ramp has an upper portion in the cavity. The upper portion of the lower ramp has outwardly extending lips on each of its sides which fit in the slideway grooves in the upper ramp.

The conveying slats and the lifting/holding slats are alternated across the width of the conveyor. The upper portions of the lifting/holding slats are moved up in response to a sliding movement of the lower portions of the lifting/holding slats towards the fixed end of the upper slat portion, and are allowed to drop downwardly in response to a sliding movement of the lower slat away from the fixed end of the upper slat portion.

When the upper portions of the lifting/holding slats are in a "down" position, the upper surfaces of the conveying slats are above the upper surfaces of the lifting/holding slats. This allows the conveying slats to be moved in unison for the purpose of moving a load in a conveying direction. At the end of each stroke of the conveying slat, the conveying slat is stopped and the upper portion of the lifting/holding slat is moved upwardly to engage the load and lift it up off of the conveying slats. Then the conveying slats are retracted back to a start position.

These and other objects, advantages and features of the present invention will become apparent from the detailed description set forth below, from the drawings, from the claims and from principles that are embodied in the specific structures that are illustrated and described.

BRIEF DESCRIPTION OF THE SEVERAL VIEWS OF THE DRAWINGS

Like reference numerals are used to designate like parts throughout the several views of the drawings, and:

FIG. 9 is a fragmentary side view of showing the upper portion of one of the lifting/holding slats in a lowered or "down" position;

FIG. 10 is a view like FIG. 9, but showing the upper portion of the lifting/holding slat in a raised or "up" position;

DETAILED DESCRIPTION OF THE ILLUSTRATED EMBODIMENTS

Figure 1:
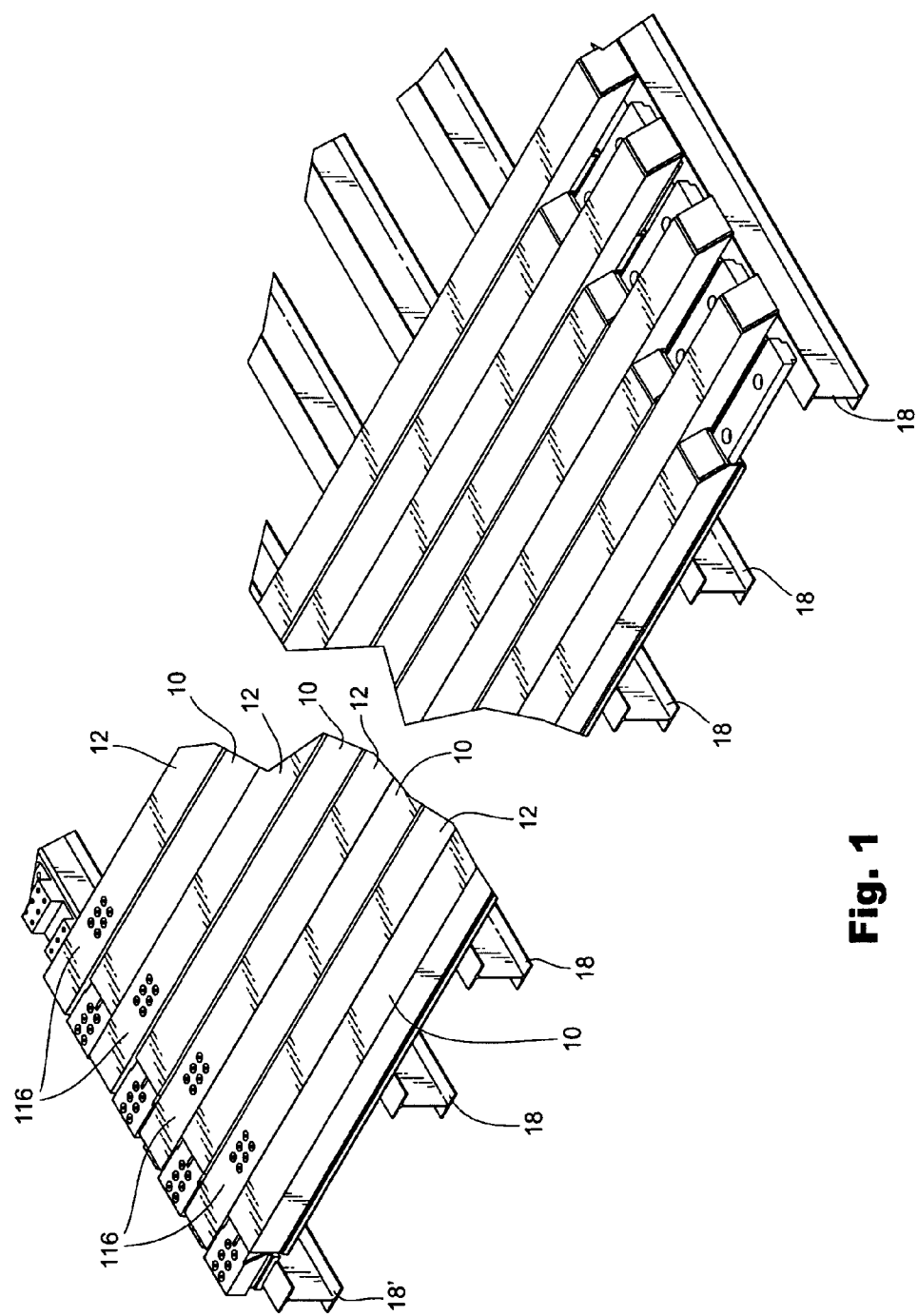
FIG. 1 is a fragmentary pictorial view of a slat conveyor embodying the present invention, such view being taken from above and looking towards the top, one side and the discharge end of the conveyor.

The aforementioned U.S. Pat. Nos. 6,439,375 and 7,185,755 each discloses a conveyor for moving palletized loads, composed of conveying slats and lifting/holding slats. The conveying slats are spaced laterally apart across the width of the conveyor. The lifting/holding slats are also spaced laterally apart and they are positioned between the conveying slats. The embodiments shown by FIGS. 47-52 in U.S. Pat. No. 6,439,375 disclose lifting/holding slats having upper slat portions that are moved back and forth in the longitudinal direction. Cams function to lift the upper portions of the slat members in response to their longitudinal movement in one direction and to lower them in response to their longitudinal movement in the opposite direction. The embodiment disclosed by U.S. Pat. No. 7,185,755 comprises lifting/holding slats having upper slat portions that move up and down, and lower slat portions that are moved back and forth in the longitudinal direction. Cams carried by the upper and lower slat members function to lift the upper portions of the slat members in response to longitudinal movement of the lower slat members in one direction and to lower them in response to longitudinal movement of the same members in the opposite direction. The conveyor of the present invention is an improvement on the conveyors shown by the two patents.

The slat conveyor of the present invention is for moving palletized loads and similar loads wherein the articles themselves each has a fixed-form wide bases that span several slats. The length and width of the conveyor can vary substantially. In the drawings, only a portion of the conveyor is illustrated. In the width direction, a substantial number of the slats are omitted. In the length direction, the slats are shown in a shortened form. By way of example, the true length may be in the order of forty to fifty feet. The conveyor may be between twenty and twenty-four slats wide, for example, with each slat being between four and six inches in width, for example.

Figure 2:
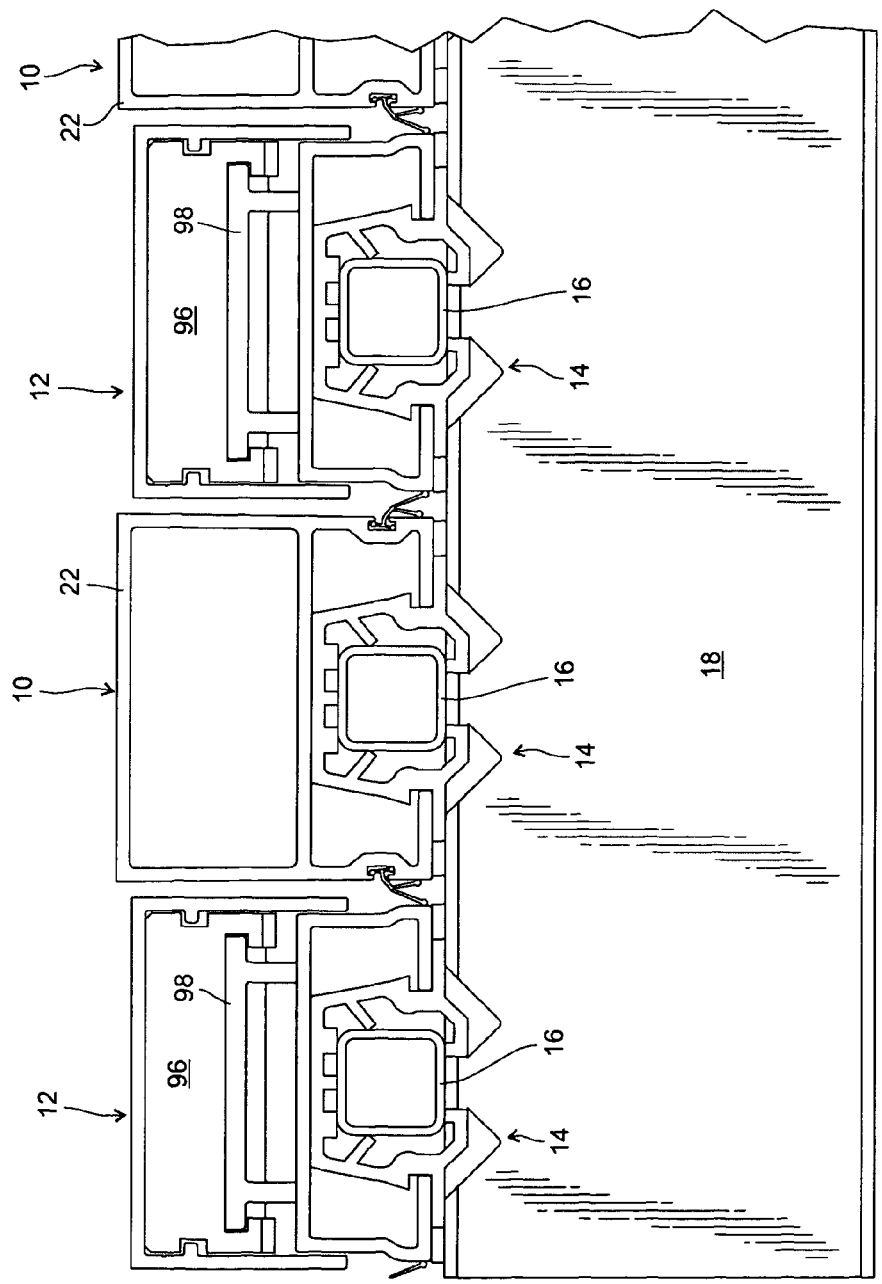
FIG. 2 is a fragmentary end elevational view of the conveyor components shown by FIG. 1, such view showing the lifting/holding slats in lowered or "down" positions.
Figure 3:
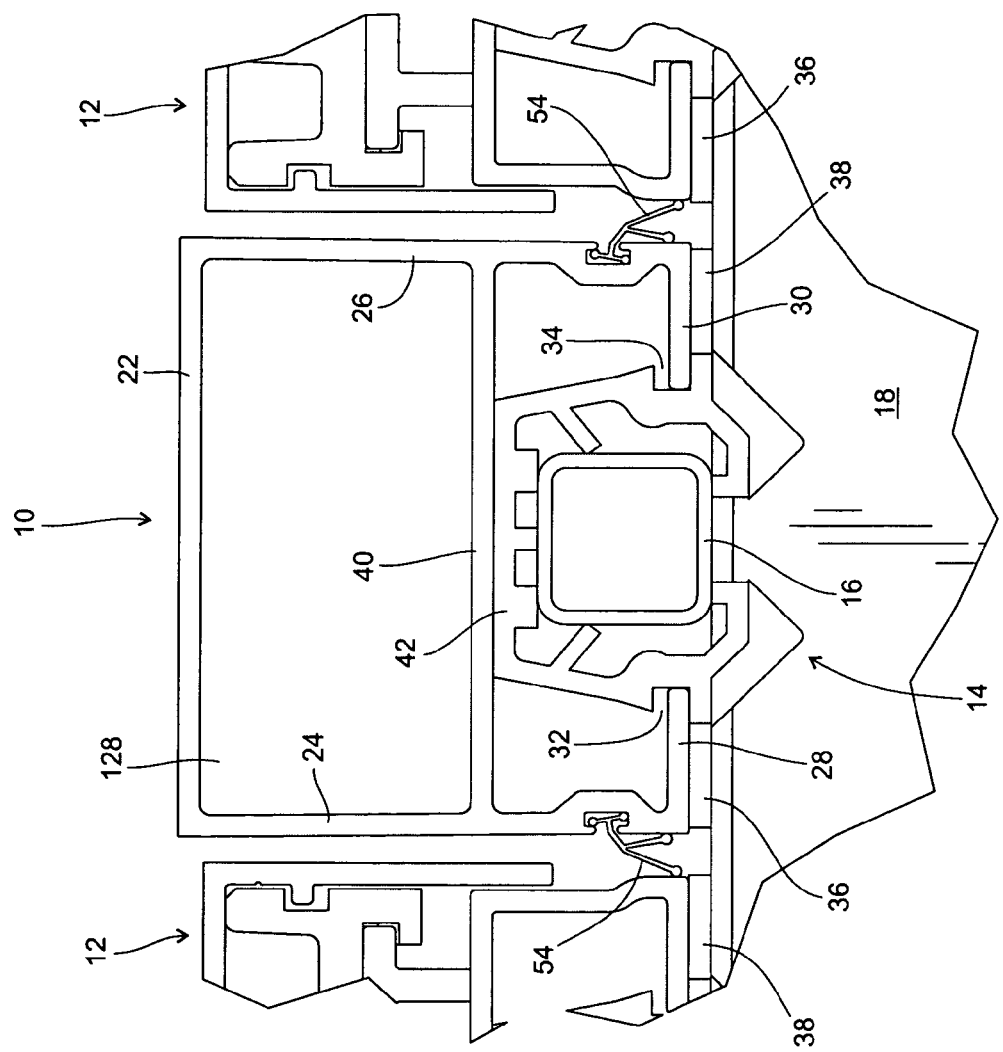
FIG. 3 is an enlarged scale end view of one of the conveying slats shown in FIG. 2.
Figure 4:
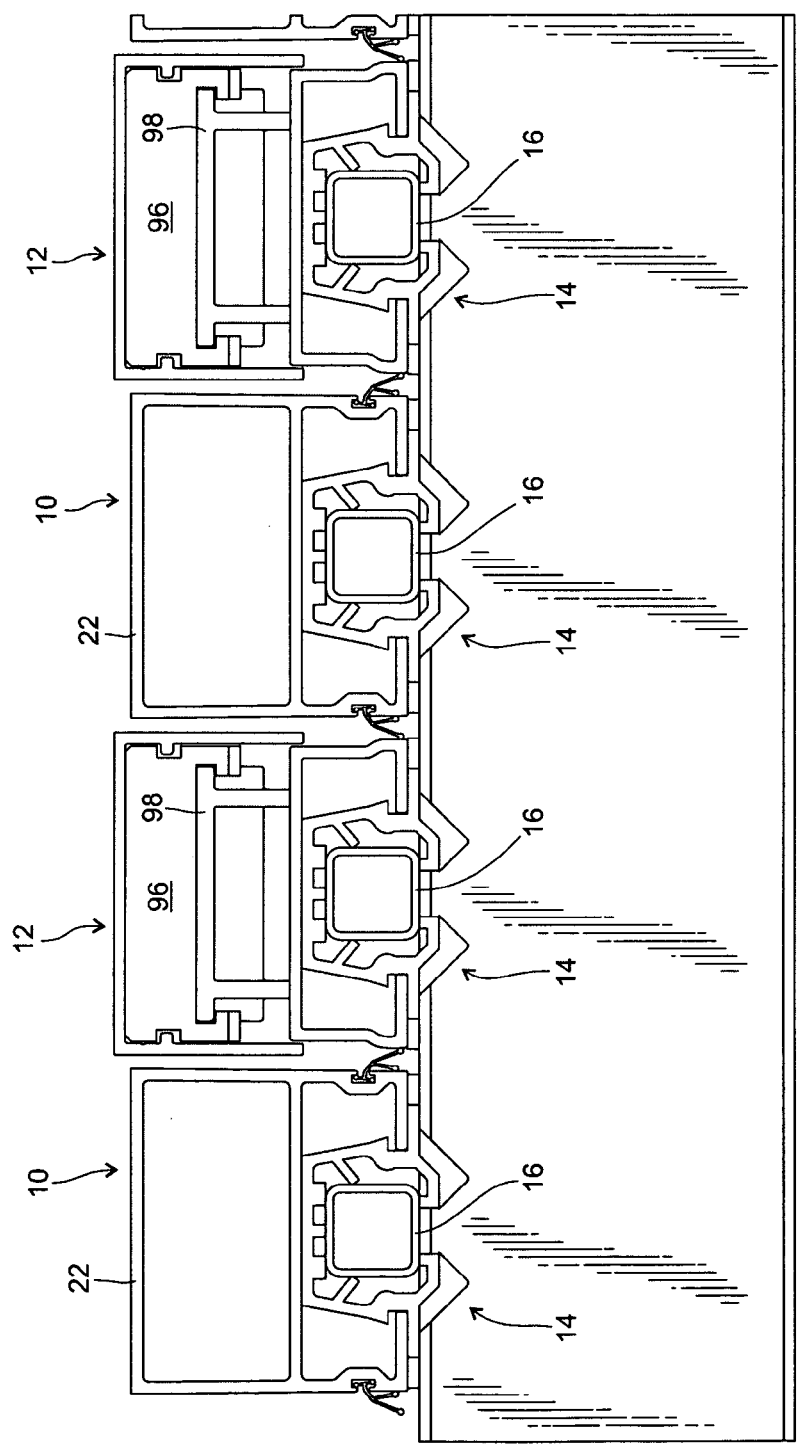
FIG. 4 is a view like FIG. 2, but showing the holding/lifting slats in raised or "up" positions.
Figure 5:
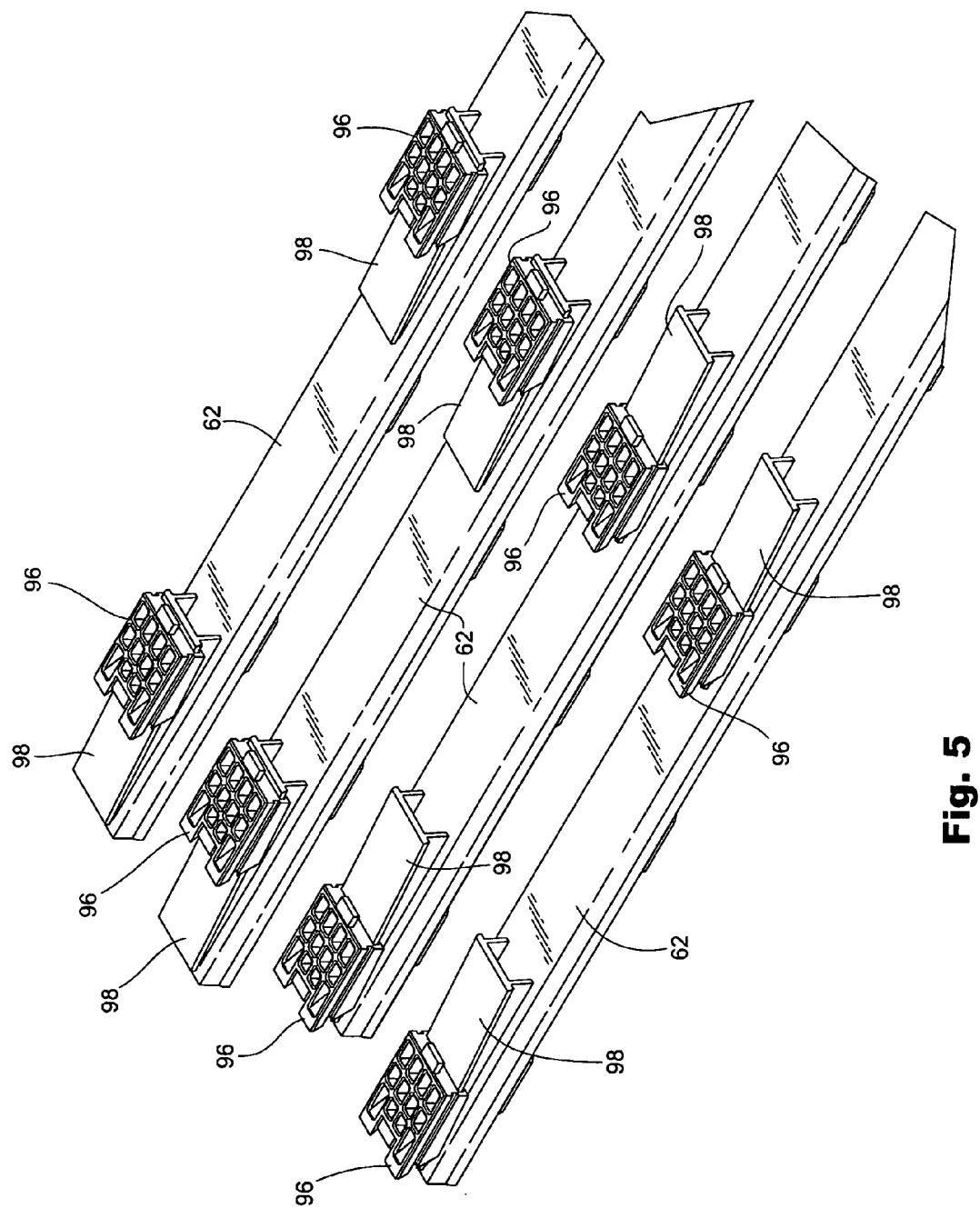
FIG. 5 is a pictorial view of the lower portion of several lifting/holding slats, showing the foreground pair of lower slat members retracted and the background pair of lower slat members extended.
Figure 6:
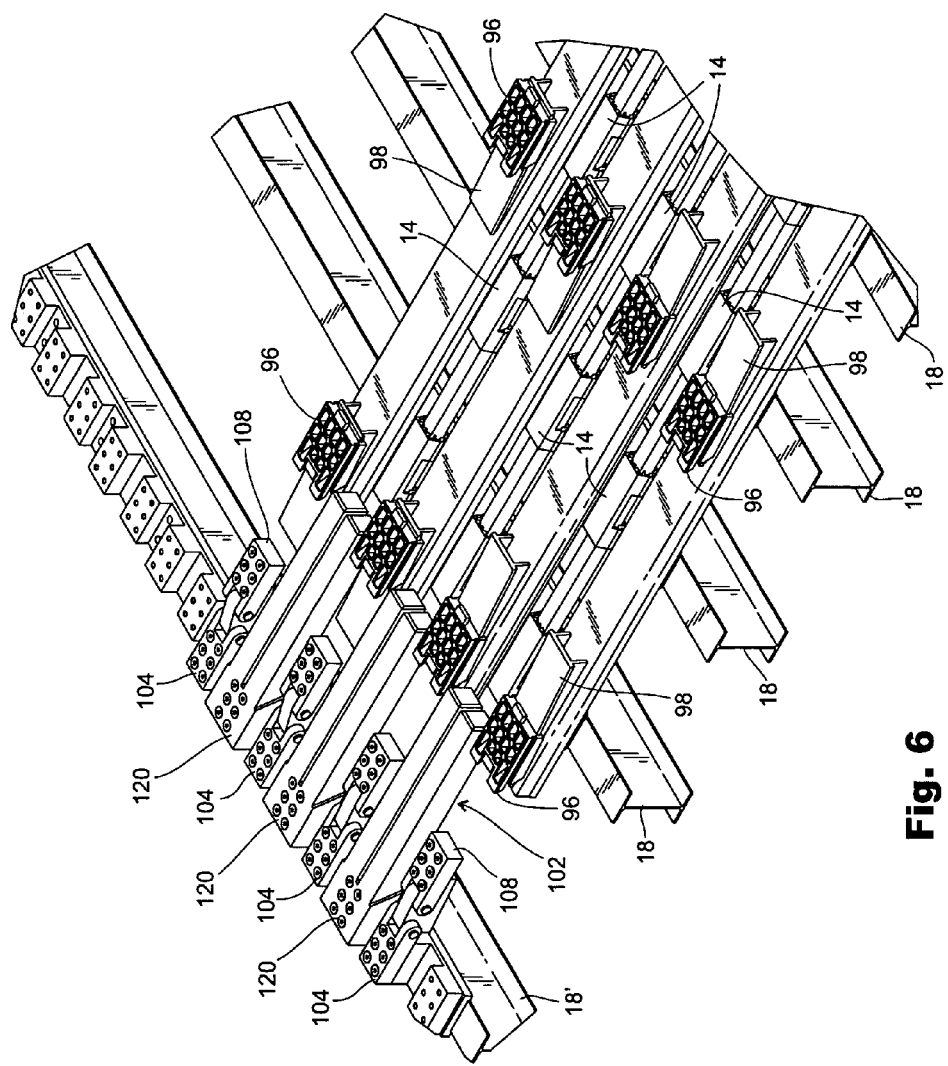
FIG. 6 is a pictorial view similar to FIG. 5, but showing longitudinal support beams and slide bearings for the conveyor slats positioned between the lower portions of the lifting/holding slats.
Figure 7:
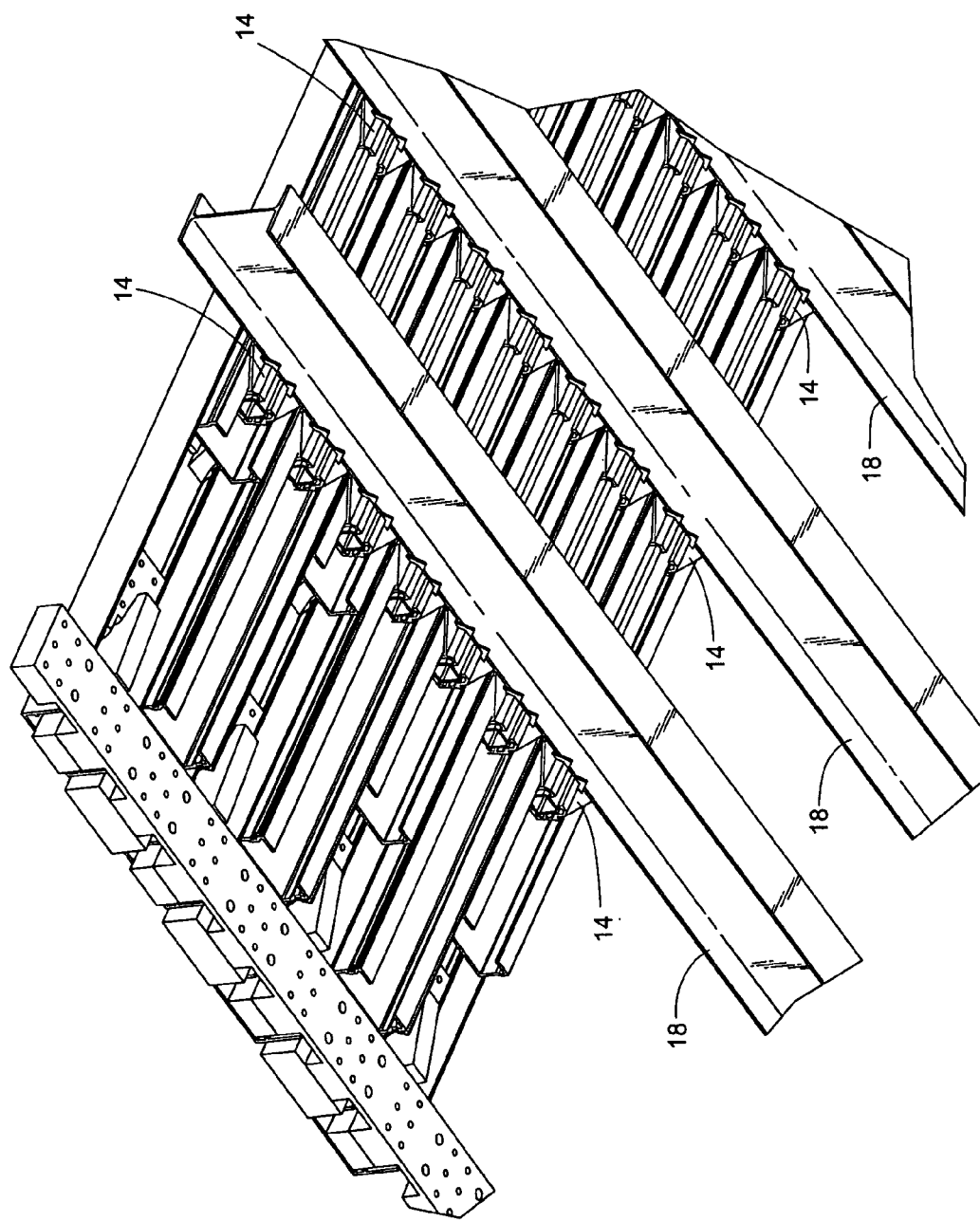
FIG. 7 is a fragmentary pictorial view of the conveyor taken from below and looking upward towards the bottom, one end and one side of the components shown in the view.
Figure 8:
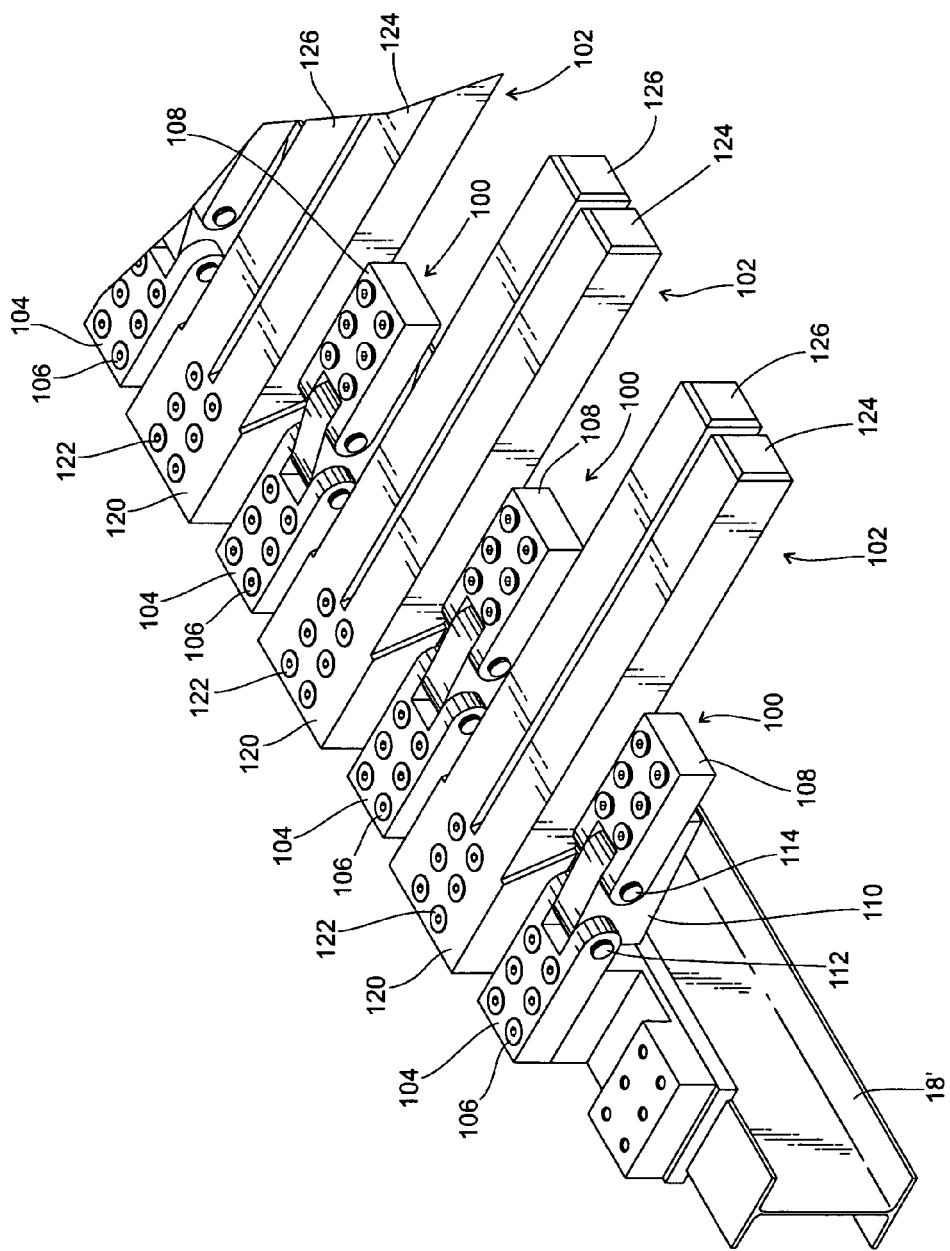
FIG. 8 is an enlarged scale view of the left end portion of FIG. 6.
Figure 11:
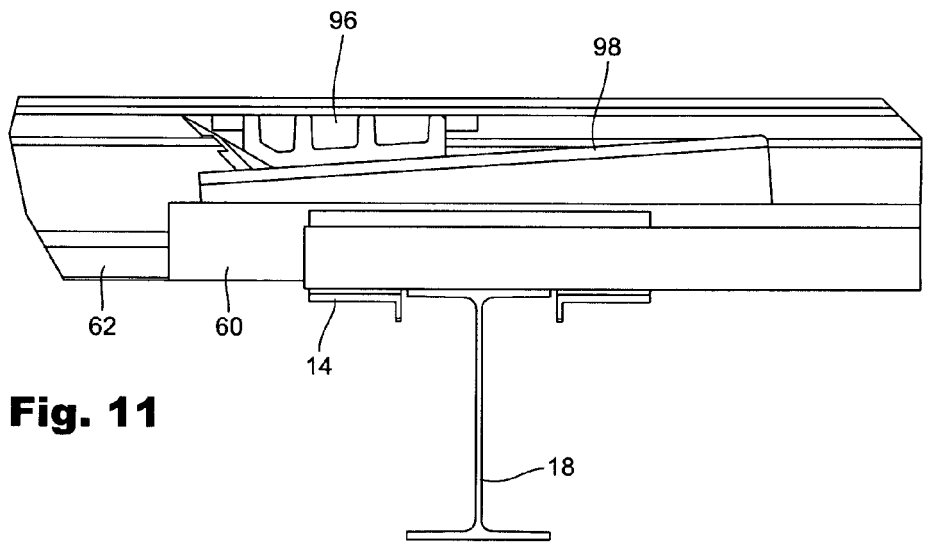
FIG. 11 is a view like FIG. 9, taken at a different location along the length of the lifting/holding slat.
Figure 12:
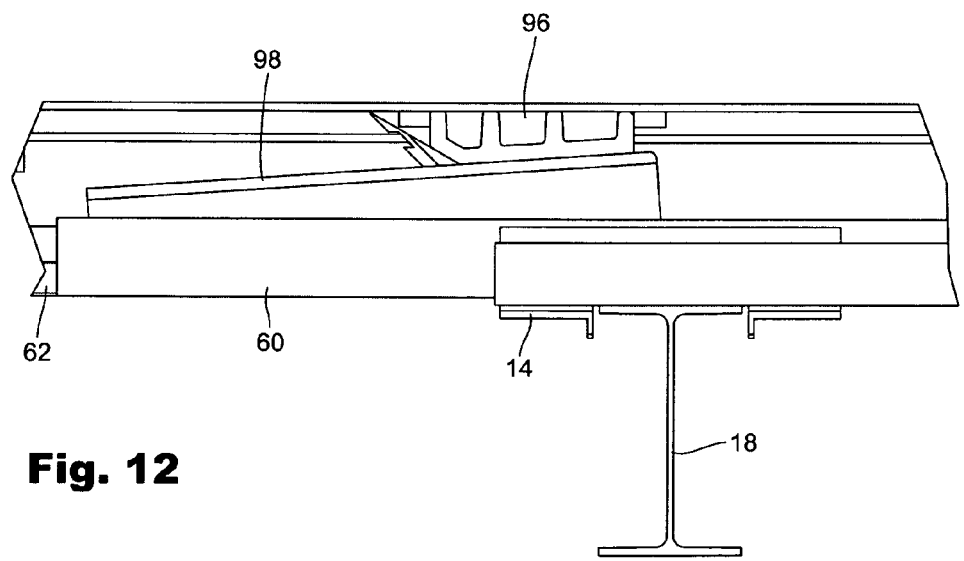
FIG. 12 is a view like FIG. 11, showing the lower portion of the lifting/holding slat extended and the upper portion raised.

Referring to FIGS. 1-3, the conveyor is shown to comprise a plurality of elongated conveying slats 10 and a plurality of elongated lifting/holding slats 12. The conveying slats 10 are spaced laterally apart and the lifting/holding slats 12 are spaced laterally apart. Each conveying slat 10 is positioned between two adjacent lifting/holding slats 12. In the illustrated embodiment, the outside side slats are lifting/holding slats 12. However, a conveying slat 10 may be located where each lifting/holding slat 12 is illustrated and a lifting/holding slat may be positioned where each conveying slat 10 is illustrated.

The conveying slats 10 are supported by and slide on slide bearings 14 which are preferably like the slide bearings disclosed in U.S. Pat. No. 4,785,929, granted Nov. 22, 1998, to Raymond K. Foster. The contents of U.S. Pat. No. 4,785,929 are hereby incorporated herein by this specific reference. The bearings 14 rest on and are supported by longitudinal beams 16 which extend over and are secured to transverse frame members 18, such as by welding. As disclosed in U.S. Pat. No. 4,785,929, the bearings 14 are adapted to snap down onto the beams 16.

The conveying slats 10 have upper and lower portions. The upper portion has a top 22 which contacts the load. Slat 10 also comprises side walls 24, 26 and bottom flanges 28, 30. The bottom flanges 28, 30 extend laterally inwardly from the side walls 24, 26 and have inner edges that are received in side recesses 32, 34 in bearings 14. The bearing 14s include side wings 36, 38 that project laterally outwardly below the bottom flanges 28, 30. A horizontal partition wall extends between the side walls 24, 26 and divides the conveyor slat 10 into said upper and lower portions. Partition wall 40 rests on the top 42 of the bearing 14. Bottom flanges 28, 30 rest on the wings 36, 38.

In the illustrated embodiment, the side walls 24, 26 include a pair of lower seal strip recesses (FIG. 3). Elongated seal strips 54 are received within the recesses. In use, the conveying slats 10 reciprocate on the bearings 14, from a start position to an advanced position and back to a start position. By way of typical and, therefore, non-limitive example, the stroke may be about one foot in length.

Figure 13:
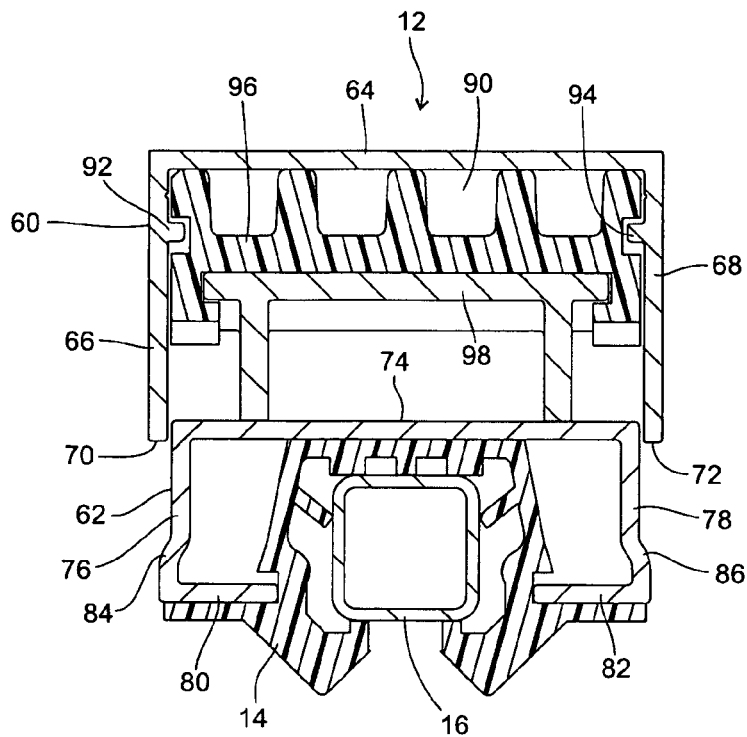
FIG. 13 is a transverse sectional view taken substantially along line 13-13 of FIG. 12.
Figure 14:
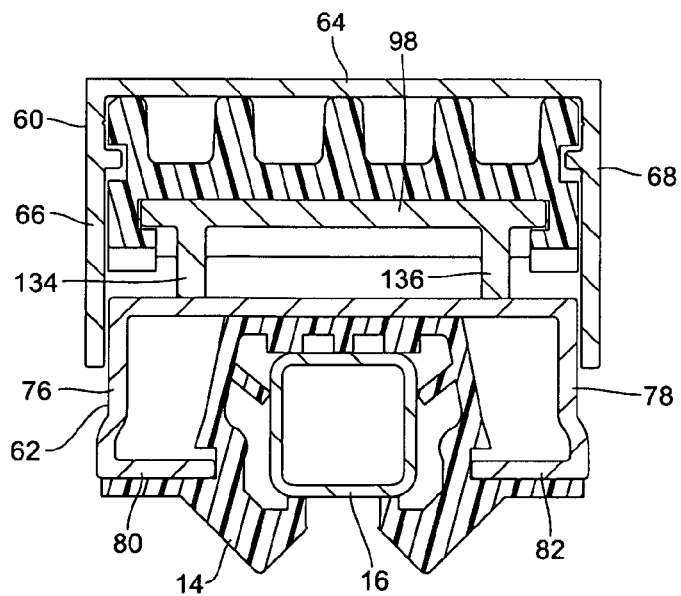
FIG. 14 is a transverse sectional view taken substantially along line 14-14 of FIG. 11.

As best shown by FIGS. 13 and 14, the lifting/holding slats 12 comprise an upper slat member 60 and a lower slat member 62. The upper slat member 60 has a top 64, side walls 66, 68 and two lower edges 70, 72. The bottom slat member 62 has a top 74, opposite side walls 76, 78, bottom flanges 80, 82 and shoulders 84, 86. The upper slat member 60 is movable vertically between an "up" position, shown in FIG. 13, and a "down" position, shown in FIG. 14.

The conveying slat 10 and the upper and lower portions 60, 62 of the lifting/holding slats 12 are preferably extrusions and are preferably made from a structural aluminum alloy. However, the invention does not depend on the materials or manufacturing methods for these parts.

An elongated chamber 90 is formed in the upper portion 60, below the top 64 and between the side walls 66, 68. A pair of flanges 92, 94 extend longitudinally of the upper portion 60 and laterally inwardly from the side walls 66, 68, and below the tops 64, as shown in FIG. 13. The chamber 90 houses upper and lower cams 96, 98. Cams 96 are attached to the upper portions 60 of the slats 12 and cams 98 are connected to the lower portions 62 of the slats 12. The construction and operation of the cams 96, 98 are hereinafter described in some detail.

Referring to FIGS. 6-10, and FIG. 8 in particular, the transverse frame member 18' at the forward end of the conveyor serves as an anchor for connectors 100 and end bearings 102. Each connector 100 comprises a fixed end block 104 connected to the frame member 18', such as by way of screws 106, and a movable block 108 that is connected to the upper portion 60 of the lifting/holding slat 12. A connecting link 110 is pivotally connected at spaced apart locations to the blocks 104, 106, such as by pivot pins 112, 114. The blocks 108 may be connected to the tops 64 of the upper portions 60 of the lifting/holding slats 12, such as by use of screws 116 (FIG. 1).

Each end bearing 102 has an outer end portion 120 that is connected to the end beam 18', such as by screws 122 (FIG. 8) and a longitudinally split inner end portion comprising side-by-side members 124, 126. Members 124, 126 fit within end portions of the conveying slats 10. The members 124, 126 make a snug but loose fit in the space 128. As a result, the conveying slat 10 can reciprocate without binding on the members 124, 126. Member 102 is made from a self-lubricated plastic and so any contact between members 124, 126 and the inner surfaces of the longitudinal space 128 is a lubricated contact. The end bearings 124, 126 provide a support for the slats 10. Throughout the remaining length of the conveyor the slats 10 are supported by the bearings 14, in known fashion.

Figure 17:
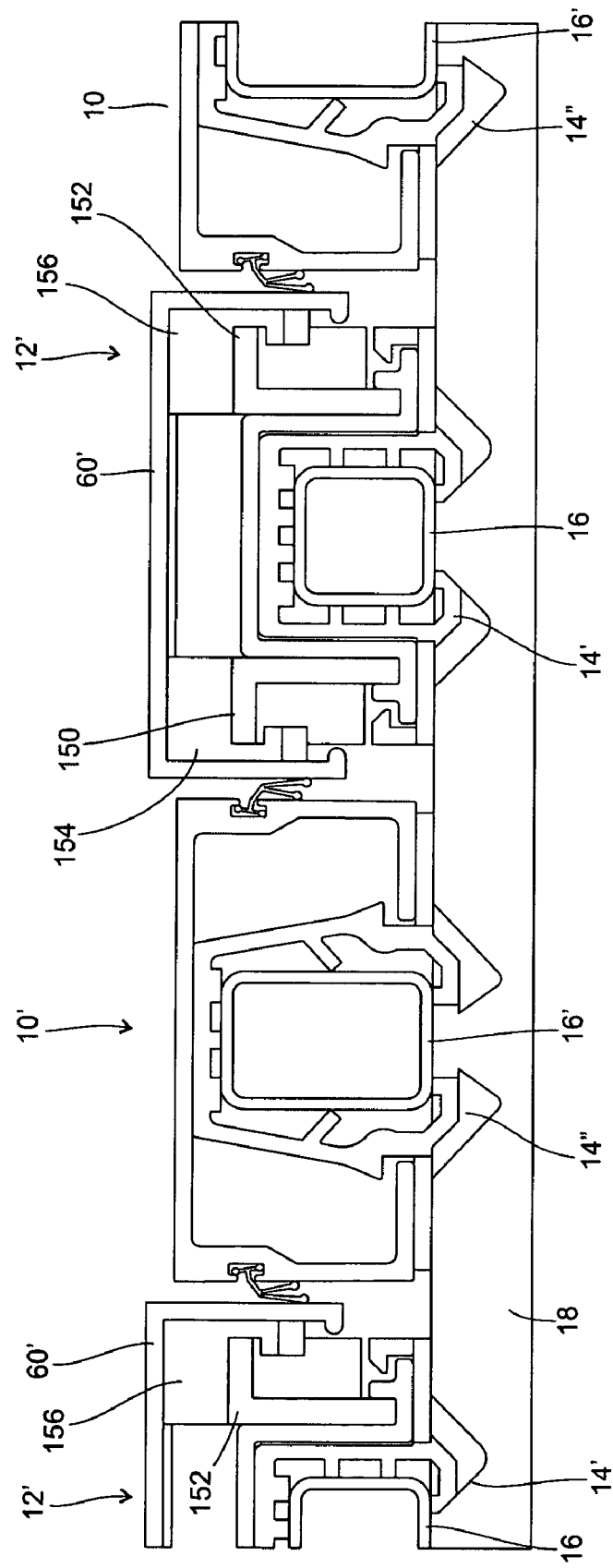
FIG. 17 is a view like FIG. 2, showing a second embodiment of the conveyor, including a modified construction of both the conveying slats and the lifting/holding slats.
Figure 18:
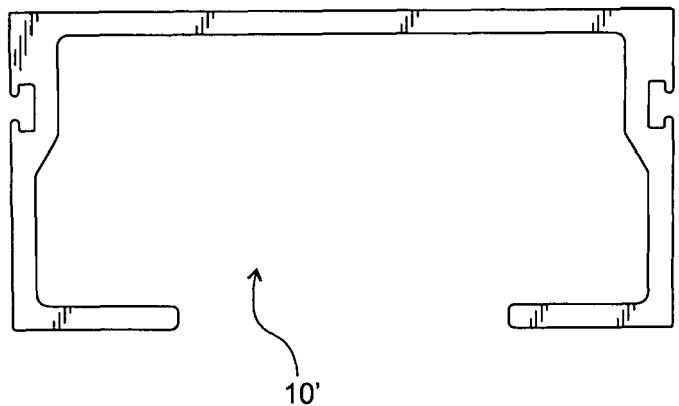
FIG. 18 is an end elevational view of the conveying slat shown in FIG. 17.
Figure 19:
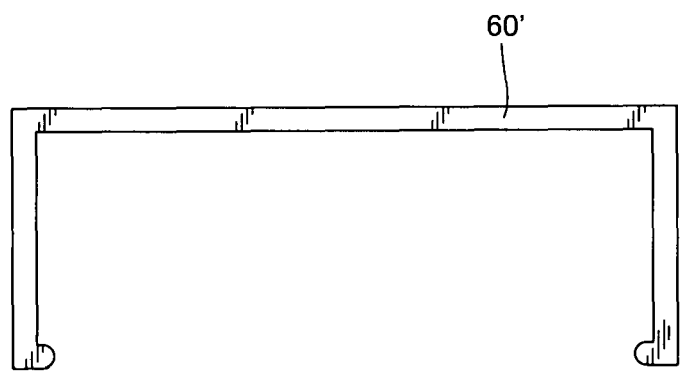
FIG. 19 is an end elevational view of the upper portion of the lifting/holding slat shown in FIG. 17.

In operation, the conveying slats 10 are moved longitudinally by hydraulic cylinder generated power. A typical drive mechanism is disclosed by FIG. 17 of U.S. Pat. No. 7,185,755. Referring to FIG. 17 of that patent, cylinders C1, C2 are coupled together and are connected to a transverse drive beam (not shown). The transverse drive beam is like the drive beam shown in FIG. 3 of U.S. Pat. No. 5,588,522. The drive beam is connected to the lower portions of the lifting/holding slats 12. A third hydraulic cylinder C3 is connected to a second transverse drive beam that is connected to the moving slats 10. Limit valves V1, V2 reverse the direction of movement of the cylinders C1, C2 in response to the cylinders reaching the end of their stroke. Limit valves V3, V2 reverse the direction of movement of the cylinders C3 and response to it reaching the end of its stroke. A person skilled in the art can read the diagram disclosed by FIG. 17 and determine how the various components work. Therefore, further explanation is not necessary.

Referring to FIGS. 9 and 10, when slat members 62 are moved to the left, the cam members 96 are moved relative to the cam members 98. FIG. 9 shows a cam member 96 in a "down" position, adjacent the lower end of the cam or ramp 98. When the slat 62 member is moved to the left, as shown in FIG. 9, the cam or ramp 98 is slid to the left below the cam 96. As a result, the cam 96 is caused to slide relatively up the cam 98, lifting with it the slat member 60 when the slat member 62 is at the end of its travel, the cam 96 is below the high end of cam 98. This is shown by FIG. 10. As the slat member 62 moves to the left, as shown in FIGS. 9 and 10, the cam 98 slides under the cam 96, moving it and the slats 60 upwardly. As the slat member 60 moves upwardly, the connecting link 110 pivots in position about the axis of the pivot pins 112, 114. At about the time that the upper cam 96 is at the upper end of the lower cam 98, the link 110 has swung into a position which places its extension 111 up into contact with the slat member 60, bracing it from moving downwardly until the link 110 is moved back to its lowered position. An important thing to note is that in the conveyor of this invention, the ramps 96, 98 slope in the opposite direction from the cams or ramps in the system disclosed by U.S. Pat. No. 7,185,755. The orientation of the cams or ramps 96, 98 in the present invention is preferred over the orientation of the ramps in the system disclosed by U.S. Pat. No. 7,185,755.

Figure 15:
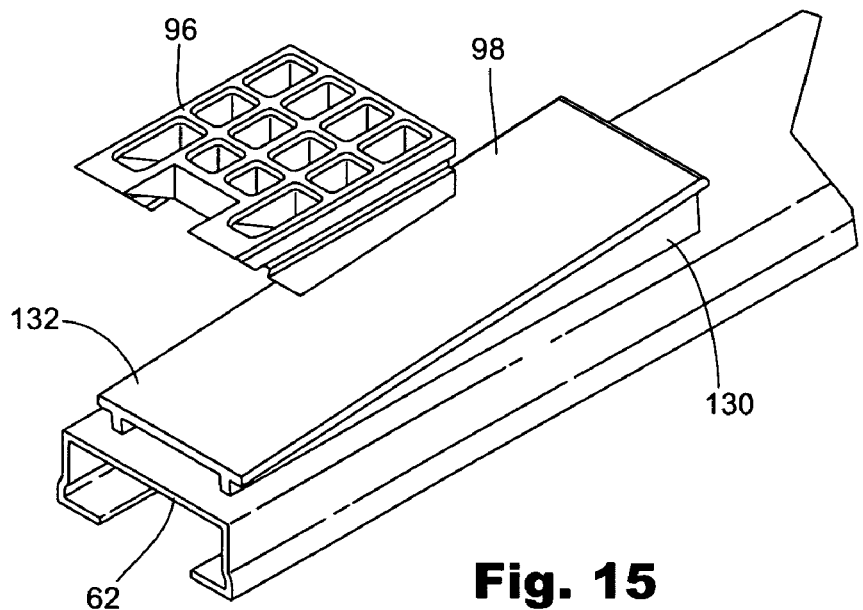
FIG. 15 is a pictorial view of a fragmentary portion of the lower slat member, showing a ramp-like cam that is welded to the top of the lower slat member, and showing a cam that is carried by the upper slat member spaced above the cam that is carried by the lower slat member.
Figure 16:
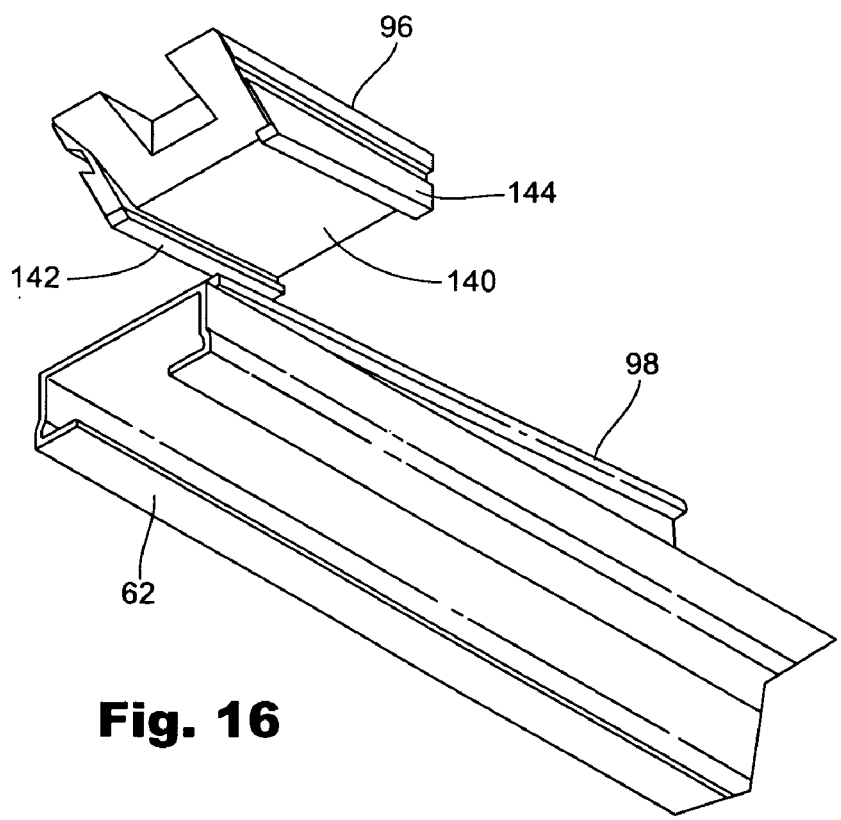
FIG. 16 is an exploded pictorial view of the components in FIG. 15, taken from below the lower slat member and looking upwardly towards the lower slat member and the cam member that is carried by the upper slat member.

Referring to FIGS. 14 and 15, the lower ramp or cam 98 may be a metal member having triangular shaped sides 130 and a rectangular top 132. At its side edges, the top 132 extends outwardly beyond, or overhangs, the side walls 134, 136. The upper cam or ramp 98 is preferably constructed from a self-lubricated plastic material. It has a plastic body 140 that includes inwardly directed lips or flanges which engage the flanges on the cam member 98 in the manner shown by FIGS. 13 and 14. Cam member 98 is fixed in position on the slat 62. As the lower slat slides, the action of the cams or ramps 96, 98 will move the upper slat member up or down, depending on the direction of sliding movement. In other respects the upper slat member 60 and the upper cam or ramp 96 are locked to the lower slat member 62 and the lower cam or ramp 98, by the interlock provided by the side slots in the ramp 96 and the side flanges on the top part 132 of ramp or cam 98.

FIGS. 17-24 show a second embodiment of the invention. In this embodiment, the cam or ramp 98' that is fixed to the sliding slat member 62' is divided into two parts, 150, 152 which are positioned along sides of the member 62'. Cam member 96' that is fixed to the upper slat member 60' has opposite side parts 154, 156 which engage the members 150, 152. The member 154, 156 are constructed from a self-lubricated plastic material and they are connected together by a sheet metal member 158 which has U-shaped end portions 160, 162 which fit into complementary shaped slots in the plastic members 154, 156.

Figure 22:
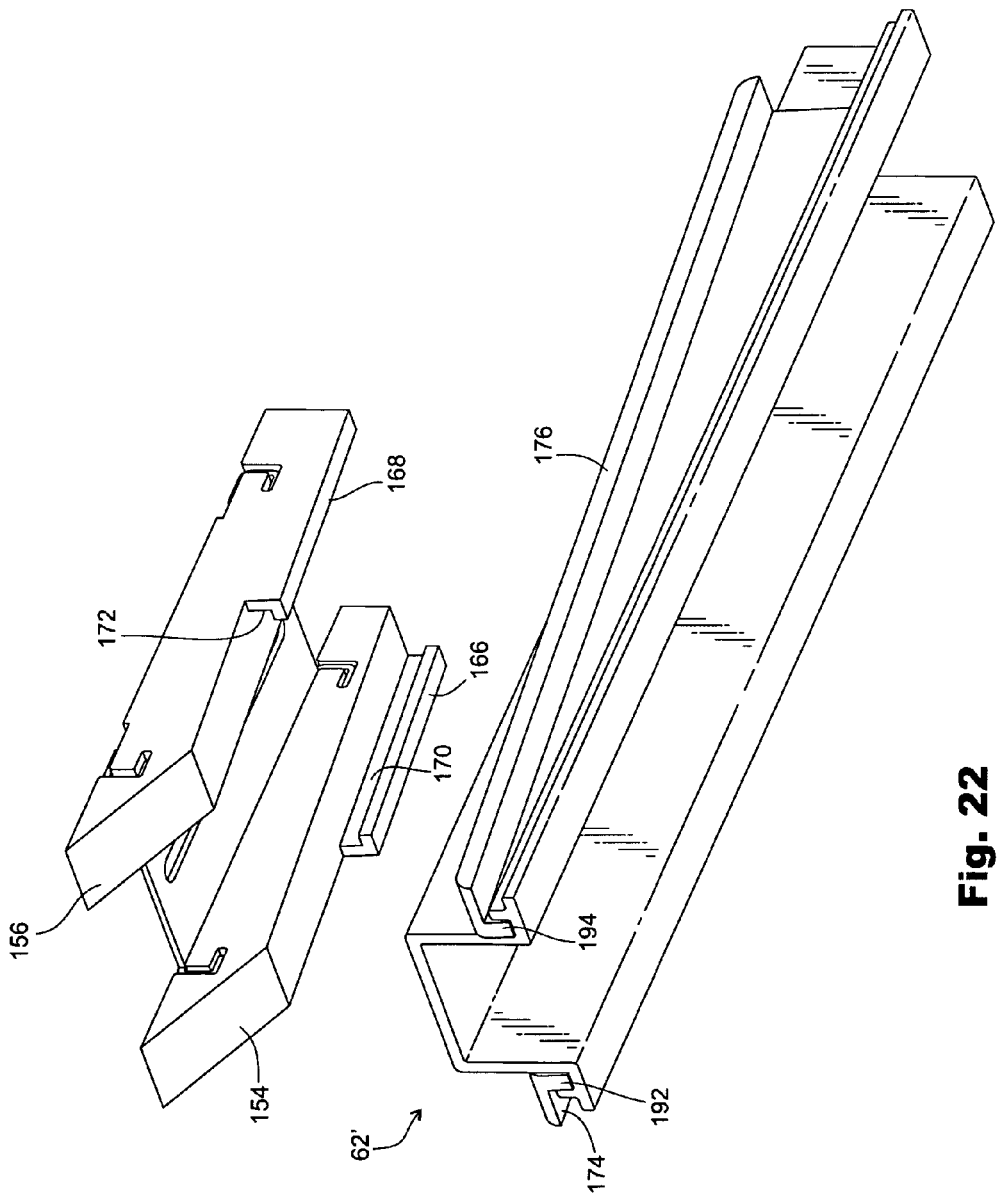
FIG. 22 is a view like FIG. 16, but of the components shown by FIG. 21.
Figure 23:
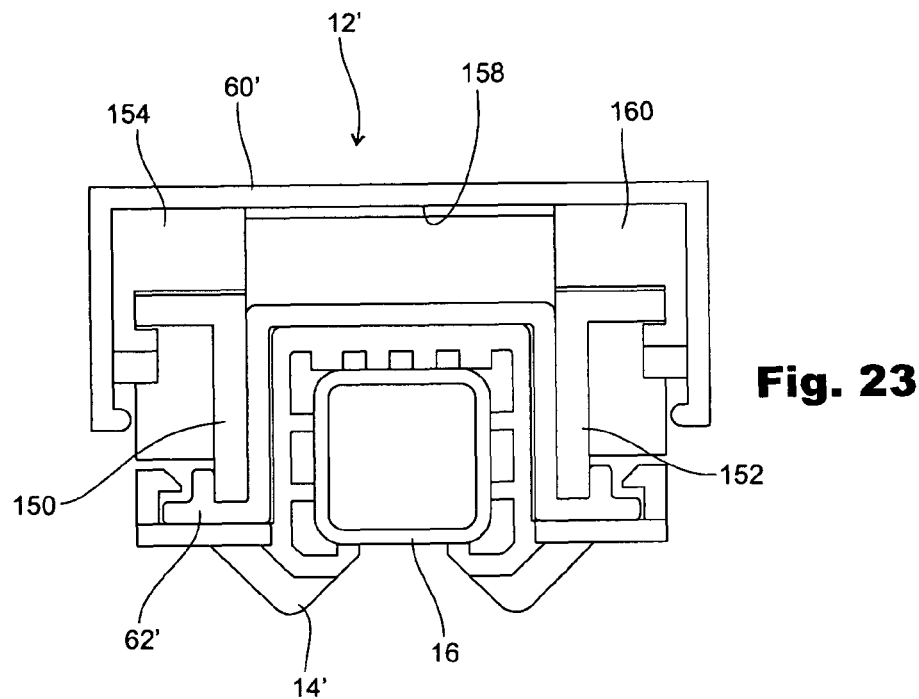
FIG. 23 is an end view of the lifting/holding slat shown by FIG. 17, showing the upper portion of the slat in a raised or "up" position.
Figure 24:
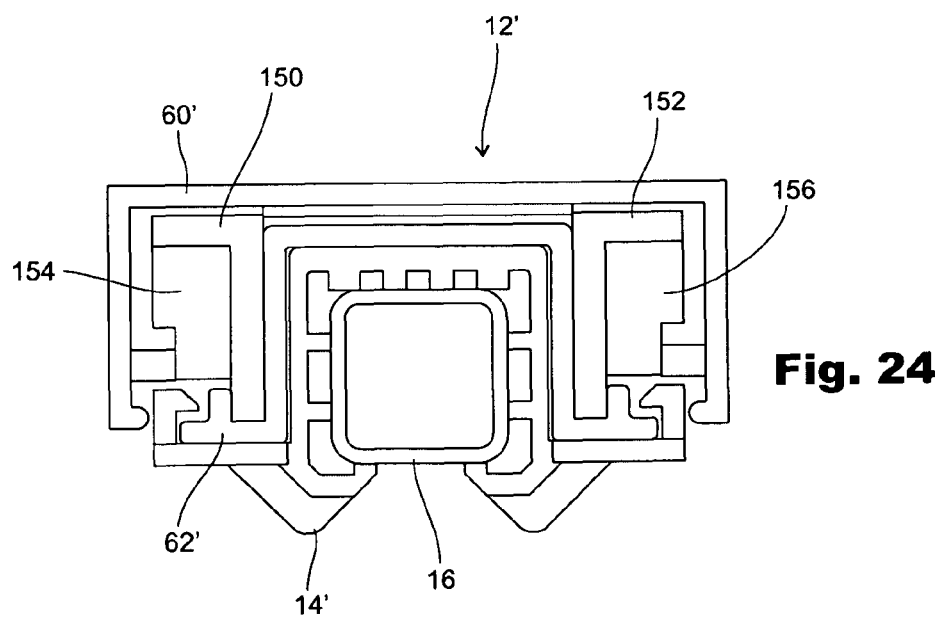
FIG. 24 is a view like FIG. 23, but showing the upper slat member in a lowered or "down" position.

As shown by FIG. 22, members 154, 156 include lower portions 166, 168 that have laterally inwardly directed slideways 170, 172. The side edges 174, 178 on parts 150, 152 of cam member 98' are sized to fit within the slideways 170, 172. The slideways 170, 172 and the members 174, 176 slope in the same way that the two cams or ramps in the first embodiment slope. They both slope downwardly towards the links 110. As a result, a sliding movement of the slat members 62' towards the fixed ends of the slats 10' will cause the cams 170, 172 and 174, 176 to raise the cam member 96' and the slat member 60' to which it is connected. Movement of the slat member 62' away from the fixed ends of the upper slat members 60' will cause the slat members 60' to move downwardly into a lowered or "down" position. This is shown by FIG. 24. The raised or "up" position is shown by FIG. 23. The positioning of the cam members 174, 176 within slat members 60', but on the sides of slat member 62', results in a shorter lifting/holding slat 12. This in turn makes it possible to make a shorter conveying slat 10'. Referring to FIG. 17, the conveying slats 10' are supported on a snap-on bearing 14' that is snapped onto a rectangular guide beam 16' that is taller than it is wide. In this embodiment there is no need to divide the conveying slat 10' into upper and lower portions divided by a horizontal wall.

Figure 20:
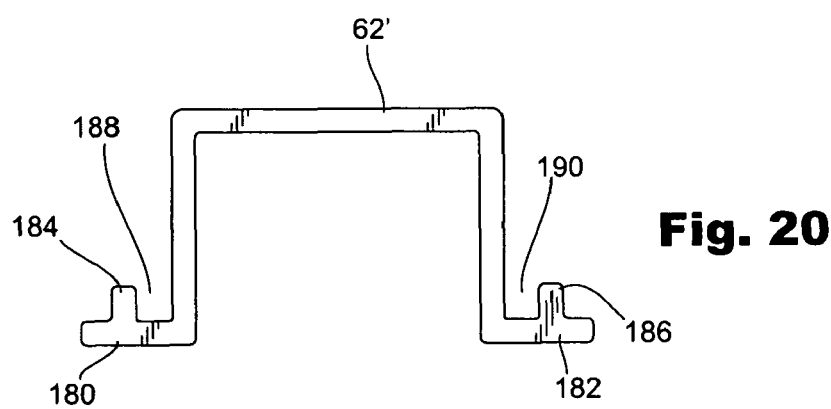
FIG. 20 is an end elevational view of the lower portion of the lifting/holding slat shown in FIG. 17.
Figure 21:
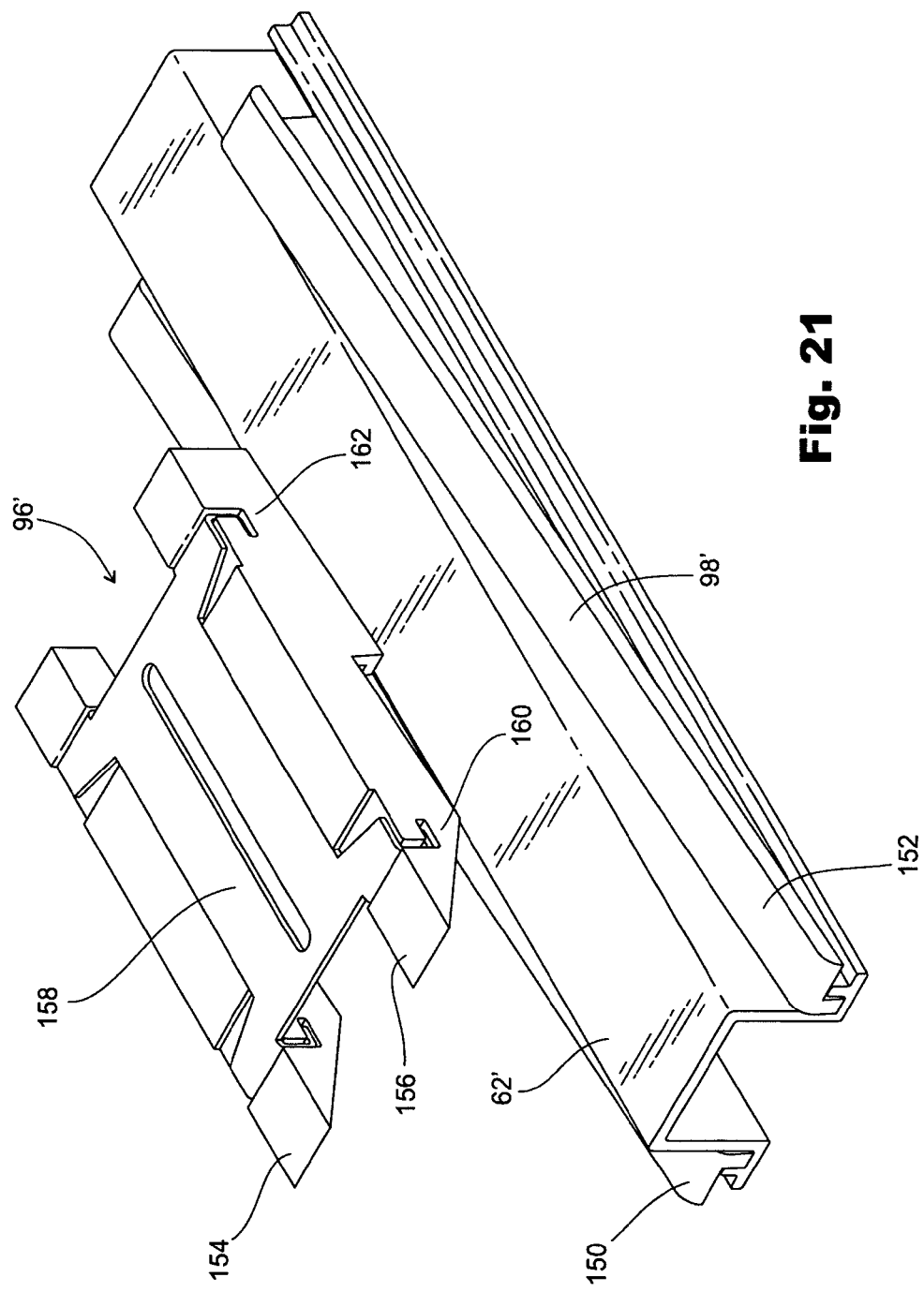
FIG. 21 is a view similar to FIG. 15, but of components of the lifting/holding slat shown by FIG. 17.

As shown by FIG. 20, the slat members 62' have laterally outwardly projecting lower flanges 180, 182. Vertical flanges 184, 186 project upwardly from the flanges 180, 182. Spaces 188, 190 are formed above the flanges 180, 182 and laterally inwardly of flange 184 on one side and laterally inwardly of flange 186 on the opposite side. Lower edge portions 192, 194 of the members 174, 176 fit within the spaces 188, 190. The members 174, 176 are connected to the sides of slat member 62' in any suitable manner.

The illustrated embodiments are only examples of the present invention and, therefore, are non-limitive. It is to be understood by many changes in the particular structure, materials and features of the invention may be made without departing from the spirit and scope of the invention. Therefore, it is my intention that my patent rights not be limited by the particular embodiments that are illustrated and described herein.

What is claimed is:

1. A conveyor, comprising:
   an elongated lower slat mounted for back and forth endwise movement;
   an elongated upper slat above the lower slat, said upper slat having an end portion and a top;
   a support endwise of the end portion of the upper slat;
   a link having a first end that is connected to the support for pivotal movement about a first horizontal axis, and a second end that is connected to the upper slat for pivotal movement about a second horizontal axis, said link including a stop arm extending from the second horizontal axis into a position below the upper slat;

upper and lower slide ramps between the upper and lower slats, said upper slide ramp being connected to the upper slat and said lower slide ramp being connected to the lower slat;

said upper slide ramp having a sloping lower surface and said lower slide ramp having a sloping upper surface, said sloping upper and lower surfaces confronting each other and both sloping downwardly towards the link;

wherein an endwise sliding movement of the lower slat towards the link will slide the lower slide ramp relatively along the upper slide ramp, causing the lower slide ramp to lift the upper slide ramp and the upper slat relative to the lower slide ramp and the lower slat; and wherein said upward movement of the upper slat relative to the lower slat will cause the link to pivot upwardly about the first axis until the stop arm on the link contacts the upper slat and stops further pivotal movement of the link about the first axis and stops further upward sliding movement of the upper slat relative to the lower slat.

2. The conveyor of claim 1, wherein said lower slat has opposite side members and said upper slat has opposite side members which are positioned outwardly adjacent the side members of the lower slat.

3. The conveyor of claim 2, wherein the upper slide ramp includes a cavity with a top and side portions including slide way grooves, and said lower slide ramp has an upper portion in said cavity, said upper portion of the lower slide cam having outwardly extending lips on each of its sides which fit in the slide way grooves in the upper slide ramp.

4. The conveyor of claim 2, comprising an elongated conveying slat extending along side of the upper and lower slats, said conveying slat being mounted for back and forth endwise movement, said conveying slat having a top, wherein said upper slat has a lower position in which its top is below the top of the conveying slat, and a raised position in which its top is above the top of the conveying slat.

5. The conveyor of claim 4, wherein the upper slide ramp includes a cavity with a top and side portions including slide way grooves, and said lower side ramp has an upper position in said cavity, said upper position of the lower slide cam having outwardly extending lips on each of the sides which fit on the slide way grooves on the upper slide ramp.

6. The conveyor of claim 1, wherein the upper slide ramp includes a cavity with a top and side portions including slide way grooves, and said lower slide ramp has an upper portion in said cavity, said upper portion of the lower slide ramp having outwardly extending lips on each of its sides which fit in the slide way grooves in the upper slide ramp.

7. The conveyor of claim 1, comprising an elongated conveying slat extending along the side of the upper and lower slats, said conveying slat being mounted for back and forth endwise movement, said conveying slat having a top, wherein said upper slat has a lowered position which its top is below the top of the conveying slat, and a raised position in which its top is above the top of the conveying slat.

* * * * *